United States Patent [19]

Patton, Jr. et al.

[11] 3,875,258

[45] Apr. 1, 1975

[54] GRAFT COPOLYMERS

[75] Inventors: John T. Patton, Jr., Wyandotte; Louis C. Pizzini, Trenton; William W. Levis, Jr., Wyandotte; Bernard A. Merkl, Detroit, all of Mich.

[73] Assignee: BASF Wyandotte Corporation, Wyandotte, Mich.

[22] Filed: Oct. 15, 1973

[21] Appl. No.: 406,534

[52] U.S. Cl.............. 260/869, 260/859 R, 260/870, 260/874, 260/899, 260/961
[51] Int. Cl. ............................................ C08f 21/00
[58] Field of Search .......... 260/869, 870, 874, 899, 260/961, 80 PS, 859 R, 80.71, 87.5 R, 87.7, 836, 837 R, 857 G

[56] References Cited
UNITED STATES PATENTS

| | | | |
|---|---|---|---|
| 2,854,434 | 9/1958 | Beaman | 260/45.4 |
| 3,163,627 | 12/1964 | Craver | 260/861 |
| 3,175,998 | 3/1965 | Rabinowitz | 260/85.5 |
| 3,210,442 | 10/1965 | Lundberg et al. | 260/869 |
| 3,577,480 | 5/1971 | Thorpe | 260/869 |
| 3,641,202 | 2/1972 | Biranowski et al. | 260/869 |
| 3,726,839 | 4/1973 | Jin | 260/78.5 CL |

*Primary Examiner*—Morris Liebman
*Assistant Examiner*—E. A. Nielsen
*Attorney, Agent, or Firm*—Joseph D. Michaels; Bernhard R. Swick; Robert E. Dunn

[57] ABSTRACT

Graft copolymers are prepared by the in situ polymerization of phosphorus or phosphorus and halogen containing monomers in the presence of a free radical catalyst in a polyol containing from about 1.0 to about 2.5 moles of unsaturated per mole of polyol.

8 Claims, No Drawings

GRAFT COPOLYMERS

BACKGROUND OF THE INVENTION

1. Field of the Invention

The present invention relates to graft copolymer dispersions which may be used to prepare urethane compositions having fire-retardant properties. More particularly, the invention relates to graft copolymer dispersions prepared by the in situ polymerization of monomers or mixtures of monomers containing phosphorus or phosphorus and halogen with an unsaturated polyol in the presence of a free radical catalyst.

2. Prior Art

Graft copolymer dispersions prepared from vinyl monomers and polyether polyols are well known in the art as evidenced by U.S. Pat. No. 3,383,351 to Stamberger and U.S. Pat. No. 3,652,639 to Pizzini et al.

SUMMARY OF THE INVENTION

In accordance with the present invention, graft copolymer dispersions are prepared by the in situ polymerization of vinyl monomers containing either phosphorus or phosphorus and halogen, or both, in a polyol having from about 1.0 to about 2.5 moles of unsaturation per mole of polyol, hereinafter referred to as "unsaturated polyol."

The graft copolymer dispersions are obtained by the simultaneous grafting of a monomer or mixture of monomers, containing either phosphorus or phosphorus and halogen in the presence of a free radical catalyst on to an unsaturated polyol at a temperature above which the free radical catalyst decomposes.

This catalyst temperature range is from about 70° C. to about 170° C., preferably between 105° C. and 135° C. The products prepared by this procedure exhibit a relatively low viscosity and can be used to prepare urethane compositions having fire-retardant properties.

DESCRIPTION OF THE PREFERRED EMBODIMENTS

The unsaturated polyols employed in the present invention may be prepared by the reaction of any conventional polyol with an organic compound having both ethylenic unsaturation and a hydroxyl, carboxyl, or epoxy group or they may be prepared by employing an organic compound having both ethylenic unsaturation and a hydroxyl, carboxyl, or epoxy group as a reactant in the preparation of the polyol. Representative of such organic compounds include unsaturated polycarboxylic acids and anhydrides such as maleic acid and anhydride, fumaric acid and anhydride, crotonic acid and anhydride, propenyl succinic anhydride, and halogenated maleic acids and anhydrides, unsaturated polyhydric alcohols such as 2-butene-1,4-diol, glycerol allylether, trimethylolallylether, pentaerythritol allylether, pentaerythritol vinylether, pentaerythritol diallylether, and 1-butene-3,4-diol, unsaturated epoxides such as 1-vinylcyclohexane-3,4-epoxide, butadiene monoxide, vinyl glycidylether(1-vinyloxy-2,3-epoxy propane), glycidyl methacrylate and 3-allyloxypropylene oxide (allyl glycidylether). If a polycarboxylic acid or anhydride is employed to incorporate unsaturation into the polyols, it is then necessary to react the unsaturated polyol with an alkylene oxide, preferably ethylene or propylene oxide, to replace the carboxyl groups with hydroxyl groups prior to employment in the present invention. The amount of alkylene oxide employed is such to reduce the acid number of the unsaturated polyol to about one or less. Representative polyols which may be employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,451, 3,190,927 and 3,346,557.

Representative polyols include polyhydroxyl-containing polyesters, polyalkylene polyether polyols, polyhydroxyterminated polyurethane polymers, polyhydroxyl-containing phosphorus compounds, and alkylene oxide adducts of polyhydric polythioethers, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-βdiethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-(4,4'-hydroxyphenol)propane, commonly known as Bisphenol A.

Any suitable polyalkylene polyether polyol may be used such as the polymerization product of an alkylene oxide or of an alkylene oxide with a polyhydric alcohol having from 2 to 6 hydroxyl groups. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxidetetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5,000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amine aniline, 1,5-diamino naphthalene, methylene dianiline, the condensation products of aniline and formaldehyde, and 2,4-diamine toluene; aliphatic amines such as methyl amine, triisopropanol amine, ethylene diamine, 1,3-propylene diamine, 1,4-butylene diamine, and 1,3-butylene diamine.

As mentioned above, in order to introduce the necessary unsaturated groups into the polyols useful as starting materials in the present invention, the organic compound having both ethylenic unsaturation and a hydroxyl, carboxyl, or epoxy group may be included in the polyol-forming reaction mixture or the unsaturation is introduced by reacting a conventional polyol with said organic compound. To prepare the unsaturated polyols of use in the present invention, from about 1.0 mole to about 2.5 moles, preferably from 1.5 moles to 2.5 moles, of said organic compound per mole of polyol is employed. The preparation of the unsaturated polyols employed in the present invention follows conventional prior art procedures such as disclosed in U.S. Pat. No. 3,275,606 and U.S. Pat. No. 3,280,077.

Generally, this requires a reaction at a temperature between 0° C. and 130° C. Both acidic catalysts, such as Lewis acid catalysts and basic catalysts such as alkali metal hydroxides, may be used. In addition, a non-catalyzed reaction may be used employing temperatures between 50° C. and 200° C.

As mentioned above, the graft copolymers of the invention are prepared by the in situ polymerization of the above-described unsaturated polyols with an ethylenically unsaturated monomers, at least one containing phosphorus or halogen. Whenever acrylonitrile is employed however, the mixture of monomers does not exceed 50 percent acrylonitrile based on the total mixture of monomers employed. Representative ethylenically unsaturated monomers which may be employed in the present invention include butadiene, isoprene, 1,4-pentadiene, 1,6-hexadiene, 1,7-octadiene, styrene, α-methylstyrene, 2,4-dimethylstyrene, ethylstyrene, isopropylstyrene, butylstyrene, phenylstyrene, methylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis(β-chloroethyl)vinyl phosphonate, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

The amount of ethylenically unsaturated monomer employed in the polymerization reaction is generally from 1 to 50 percent, preferably from 2 to 40 percent, based on the weight of the unsaturated polyol. The polymerization occurs by simultaneously adding at a steady or constant rate the monomer and a free radical catalyst to the unsaturated polyol at a temperature between about 80° C. and 175° C. to 135° C. Optionally, the catalyst may be dispersed in a portion of the polyol and thereafter added along with the monomer to the remaining portion of the unsaturated polyol.

The concentration of the catalyst is also a critical aspect of the present invention and can vary from about 0.5 percent to about 10 percent, preferably from about 1 percent to about 5 percent by weight based on the weight of the monomer.

Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-$\alpha$-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis-(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, $\alpha$-methylbenzyl hydroperoxide, $\alpha$-methyl-$\alpha$-ethyl benzyl hydroperoxide, Tetralin hydroperoxide, triphenylmethyl hydroperoxide, diphenylmethyl hydroperoxide, $\alpha$-$\alpha$-azo-2 methyl butyronitrile, $\alpha,\alpha'$-2-methyl heptonitrile, 1,1'-azo-1-cyclohexane carbonitrile, dimethyl $\alpha,\alpha'$-azoisobutyrate, 4,4'-azo-4-cyanopentanoic acid, azobis-(isobutyronitrile), persuccinic acid, diisopropyl peroxy dicarbonate, and the like; a mixture of catalysts may also be used. Azobis (isobutyronitrile) is the preferred catalyst.

In a preferred embodiment of the present invention, from 2 to 40 percent by weight of bis($\beta$-chloroethyl) vinyl phosphonate, and from 2 to 40 percent by weight vinylidene chloride based on the weight of the unsaturated polyol is polymerized in an unsaturated polyol in the presence of from 1 to 5 percent by weight of azobis-isobutyronitrile based on the weight of the polyol at a temperature between 105° C. to 135° C. The resulting product had a hydroxyl number of 43.0 and contained 2.3 percent phosphorus and 6.6 percent chlorine and a Brookfield viscosity at 25° C. of 2275 centipoises.

In still another preferred embodiment of the present invention, the foregoing graft copolymer dispersions are employed in the preparation of polyurethane compositions, particularly polyurethane foams. The resulting polyurethane products exhibit marked improvements in fire-retardant properties without substantial impairment of the other physical properties of the products. The polyurethane products are generally prepared by the reaction of the graft copolymer dispersions with an organic polyisocyanate, optionally in the presence of additional polyhydroxyl-containing components, chain-extending agents, catalysts, surface-active agents, stabilizers, blowing agents, fillers and pigments. Suitable processes for the preparation of cellular polyurethane plastics are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifuoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the graft copolymer dispersions are preferably employed along with another polyhydroxyl-containing component commonly employed in the art. Any of the polyhydroxyl-containing components which are described above for use in the preparation of the graft copolymer dispersions of the present invention may be employed along with the unsaturated polyols in the preparation of the polyurethane compositions of the present invention.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine, 1,4-cyclohexane-bis-(methylamine), ethylene diamine, N,N'-di(2-hydroxypropyl)ethylene diamine, piperazine, 2-methylpiperazine, morpholine, and dodecahydro-1,4,7,9b-tetraazaphenalene.

Any suitable catalyst may be used including tertiary amines, such as for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organometallic compounds such as are disclosed in U.S. Pat. No. 2,846,408.

A wetting agent or surface-active agent is generally necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The following examples illustrate the nature of the invention. All parts are by weight unless otherwise stated.

EXAMPLE I

A. Preparation of an Unsaturated Polyether-Ester Polyol

A clean, dry, nitrogen-filled stainless steel reactor equipped with a thermometer, stirrer, nitrogen source inlet means and heat exchange means was charged with 484 pounds of a 3,000 molecular weight polyol prepared by the condensation of propylene oxide with glycerol in the presence of potassium hydroxide (7 percent by weight based on glycerol). The reactor was heated to 103° C., stripped for ½ hour at 10 mm. Hg pressure, the reactor was cooled to approximately 35° C. and 24 pounds of maleic anhydride was charged. The reactor was sealed, evacuated to 10 mm. Hg pressure or less, the agitator was turned on and the vacuum was checked. The vacuum was then relieved with nitrogen and pressured to 75 mm. Hg. The reactor was again evacuated to 10 mm. Hg or less. The reactor was then heated to 175° C. Propylene oxide, 42 pounds, was added as fast as possible during the heating period. The reaction mixture was stirred for 11 hours at 175° C. After completing the reaction, the reactor was cooled to 100° C., and the product was stripped for 1 hour at 10 mm. Hg pressure or less. The product, a clear colored liquid, had a Brookfield viscosity at 25°C. of 1200 centipoises, a hydroxyl number of 54 and contained about 1.4 to 1.5 moles of maleic anhydride per 3,200 parts of polyol.

B. Preparation of a Transparent Graft Copolymer

A reaction flask equipped with a stirrer, thermometer, reflux condenser, nitrogen inlet and two calibrated addition funnels was charged with 200 g. of the unsaturated polyol prepared above. The reaction flask was flushed with nitrogen and heated to 125°C. with stirring under a slight nitrogen flow. While stirring under a slight nitrogen flow, 46.6 g. of bis($\beta$-chloroethyl) vinyl phosphonate was added at a steady rate over 65 minutes. Simultaneously, a slurry of 4.7 g. of (VAZO) azo-bis(isobutyronitrile) in 135 g. of the unsaturated polyol were then added to the reactor in a steady rate over 92 minutes. The reaction mixture was stirred at 120°C. for 40 minutes and then stripped for ½ hour at 120°C. The product was a clear, yellow liquid having a Brookfield viscosity of 12,000 centipoises at 25°C., hydroxyl number 47.8, phosphorus content of 1.7 percent and a chlorine content of 3.6 percent.

EXAMPLE II

A one-liter reaction flask equipped with a stirrer, thermometer, water-cooled reflux condenser, nitrogen inlet, and two laboratory pumps used for metering the monomer and the (VAZO) azo-bis(isobutyronitrile) streams was charged with 336 g. of unsaturated polyol, prepared as described in Example I. Upon flushing the reactor well with nitrogen, a steady and continuous addition of a mixture of 58.2 g. of bis($\beta$-chloroethyl) vinyl phosphonate and 26.0 g. of styrene in one stream and a suspension of 4.9 g. of (VAZO) azo-bis(isobutyronitrile) in 164 g. of the above-described unsaturated polyol in a second stream was made to the reactor at a temperature of 125°C. to 130°C. The monomer stream was added over a period of 45 to 60 minutes to the reactor while the VAZO stream was added over a period of 8 to 15 minutes longer than the monomer stream. Upon the completion of the addition of the VAZO stream, the reaction mixture was maintained for one hour at 125°C. to 130°C. The reaction mixture was then stripped for one hour at 120°C. to 130°C. at 10 mm. Hg to remove all volatiles. The product had the following properties: a hydroxyl number of about 47, a Brookfield viscosity at 25°C. of about 3,000 cps., a phosphorus content of 1.4 percent and a chlorine content of 2.94 percent.

EXAMPLE III

A one-liter reaction flask equipped with a stirrer, thermometer, water-cooled reflux condenser, nitrogen inlet, and two laboratory pumps used for metering the monomer and the (VAZO) azo-bis(isobutyronitrile) streams was charged with 194 g. of unsaturated polyol, prepared as described in Example I. Upon flushing the reactor with nitrogen, a steady and continuous addition was made to the reactor of a mixture of 58.2 g. of bis($\beta$-chloroethyl) vinyl phosphonate and 72.8 g. of vinylidene chloride concurrently with a suspension of 7.7 g. of (VAZO) azo-bis(isobutyronitrile) in 306 g. of the unsaturated polyol described in Example I. The temperature throughout the addition was maintained at 125°C. to 130°C. The monomer stream was added over a period of 45 to 60 minutes while the VAZO stream took about 8 to 15 minutes longer. Upon the completion of the addition of the VAZO stream, the reaction mixture was maintained for one hour at 125°C. to 130°C. The reaction mixture was then stripped for 1 hour at 120°C. to 130°C. at 10 mm. Hg or less to remove all volatiles. The resulting product had a hydroxyl number of 46.5, a Brookfield viscosity at 25°C. of 2100 centipoises, and contained about 1.3 percent phosphorus and 6.1 percent chlorine.

EXAMPLE IV

A one-liter reaction flask equipped with a stirrer, thermometer, water-cooled reflux condenser, nitrogen inlet and two laboratory pumps used for metering the monomer and the (VAZO) azo-bis(isobutyronitrile) streams was charged with 100 g. of unsaturated polyol, prepared as described in Example I. After flushing the reactor with nitrogen and heating the flask to 125°C., a steady and continuous addition was made to the reactor of a stream of a mixture of 58.2 g. bis($\beta$-chloroethyl) vinyl phosphonate, 74.6 g. vinylidene chloride and 52 g. styrene. A suspension of 10.8 g. (VAZO) azo-bis(isobutyronitrile) in 400 g. of the unsaturated polyol described in Example I was added in a second stream. The temperature throughout the addition was maintained at 125°C. to 130°C. The monomer stream was added over a period of 45 to 60 minutes while the VAZO stream took about 8 to 15 minutes longer. Upon the completion of the addition of the VAZO stream, the reaction mixture was maintained for one hour at 125°C. to 130°C. The reaction mixture was then stripped for 1 hour at 120°C. to 130°C. at 10 mm. Hg pressure or less to remove all volatiles. The resulting product had a hydroxyl number of 42, a Brookfield viscosity at 25°C. of 5,800 centipoises, and contained 1.25 percent phosphorus and 5.6 percent chlorine.

EXAMPLE V

A one-liter reaction flask equipped with a stirrer, thermometer, water-cooled condenser, nitrogen inlet and two laboratory pumps used for metering the monomer and the (VAZO) azo-bis(isobutyronitrile) streams was charged with 332 g. of unsaturated polyol, prepared as described in Example I. After flushing the reactor with nitrogen and heating the flask to 125°C., a steady and continuous addition was made to the reactor of a stream of a mixture of 56 g. bis($\beta$-chloroethyl) vinyl phosphonate and 19 g. of vinylidene chloride and simultaneously with a stream of a mixture of 4.4 g. of (VAZO) azo-bis(isobutyronitrile) in 172 g. of the unsaturated polyol, described in Example I. The temperature throughout the addition was maintained at 125°C. to 130°C. The monomer stream was added over a period of 53 minutes, while the VAZO stream addition took about 55 minutes. After the addition of the VAZO stream, the reaction was maintained for one hour at 125°C. to 130°C. The reaction mixture was then stripped for one hour at 5 mm. Hg pressure at about 130°C. to remove all volatiles. The product had a hydroxyl number of 43, a Brookfield viscosity at 25°C. of 2,275 centipoises and contained 1.3 percent phosphorus and 3.8 percent chlorine.

EXAMPLE VI

A one-liter reaction flask equipped with a stirrer, thermometer, water-cooled condenser, nitrogen inlet and two laboratory pumps used for metering the monomer and the (VAZO) azo-bis(isobutyronitrile) streams was charged with 332 g. of unsaturated polyol, prepared as described in Example I. After flushing the reactor with nitrogen and heating the flask to 125°C., a steady and continuous addition was made to the reactor of a stream of a solution of 15 g. of styryl bis(hydroxypropyl) phosphonate in 60 g. of toluene simultaneously with 4.4 g. of (VAZO) azo-bis(isobutyronitrile) in 168 g. of the unsaturated polyol, described in Example I. The temperature was maintained at 121°C. to 127°C. The monomer stream was added over a period of 40 minutes while the VAZO stream addition took 54 minutes. After the addition of the VAZO stream, the reaction was maintained for one hour at 125°C. to 130°C. The reaction mixture was then stripped for 1 hour at 5 mm. Hg pressure at about 130°C. to remove all volatiles. The product had a hydroxyl number of 63.8, a Brookfield viscosity at 25°C. of 1850 centipoises and had a phosphorus content of 0.25 percent by weight.

EXAMPLE VII

A. Preparation of an Unsaturated Polyether Polyol

A clean, dry, nitrogen-filled stainless steel autoclave equipped with a thermometer, stirrer, nitrogen source, inlet means and heat exchange means was charged with 375 g. of a 335 molecular weight polyol prepared by the condensation of propylene oxide with glycerol in the presence of potassium hydroxide (7 percent by weight based on glycerol). The reactor was evacuated to 10 mm. Hg pressure at room temperature and then heated to 105°C. With constant stirring, a mixture of 127 g. of allyl glycidyl ether and 4438 g. of propylene oxide was added over ten hours. The reaction temperature was then maintained at 105°C. for 4.5 hours. The reactor was then vented to 0 psig. and then pressurized to 34 psig. with nitrogen. Next, 870 g. of ethylene oxide were added over a period of 1.5 hours maintaining the temperature at 105°C. Upon completion of the oxide addition, the reaction mixture was maintained at 105°C. for 1 hour. The reactor was then cooled to 40°C. and the product was discharged. It was treated with an adsorbent, filtered, and then stripped for 1 hour at 10 mm. Hg pressure or less. The product had a hydroxyl number of 37, a Brookfield viscosity at 25°C. of 1,000 centipoises and contained about 1.0 mole of allyl glycidyl ether per mole of polyol.

B. Preparation of a Transparent Graft Copolymer

A reaction flask equipped with a stirrer, thermometer, reflux condenser, nitrogen inlet and two laboratory pumps used for metering the monomer and the (VAZO) azo-bis(isobutyronitrile) streams was charged with 332 g. of the unsaturated polyol prepared in section (A) of this example. Upon flushing the reactor with nitrogen, a steady and continuous addition to the reactor was made of a mixture of 62.6 g. of bis($\beta$-chloroethyl) vinyl phosphonate, 137.5 g. acrylonitrile, and 133.3 g. of styrene in one stream concurrently with a suspension of 19.7 g. of (VAZO) azo-bis(isobutyronitrile) in 168 g. of the unsaturated polyol as prepared in section (A) of this example in a second stream. The temperature throughout the reaction was maintained at 125°C. to 130°C. The monomer stream was added over a period of 130 minutes while the VAZO stream took about 10 minutes longer. Upon the completion of the addition of the VAZO stream, the reaction mixture was maintained for one hour at 125°C. to 130°C. The reaction mixture was then stripped for one hour at 120°C. to 130°C. at 10 mm. Hg pressure or less to remove all volatiles. The resulting product had a hydroxyl number of 21.9, a Brookfield viscosity at 25°C. of 96,000 centipoises and contained 0.65 percent phosphorus and 2.6 percent chlorine.

EXAMPLE VIII

A 1-gallon stainless steel autoclave equipped with a stirrer, thermocouple, monomer inlet, cooling coils, rotameter, and addition bomb was charged with 1,500 g. of the unsaturated polyol, prepared as described in Example I. Upon flushing the reaction vessel with nitrogen and evacuating to full vacuum the addition of a mixture of 93.8 g. of bis($\beta$-chloroethyl) vinyl phosphonate, and 281.2 g. of vinyl chloride in one stream concurrently with a solution of 25 g. of (VAZO) azobis(isobutyronitrile) in 375 g. of chloroform in a second stream was made to the reactor at a temperature of 105°C. The monomer mixture was added over a period of 210 minutes while the addition of the chloroform solution of VAZO took an additional five minutes. Upon completion of the VAZO addition, the reaction mixture was maintained at 105°C. for three additional hours with constant stirring. The reaction mixture was then stripped for ½ hour at less than 1 mm. Hg pressure at 90°C. to remove all the volatiles. The resulting product had a hydroxyl number of 47.8, a Brookfield viscosity at 25°C. of 11,460 centipoises and contained 0.72 percent phosphorus and 5.8 percent chlorine.

EXAMPLE IX

A 1-gallon stainless steel, steam heated autoclave equipped with a stirrer, thermocouple, monomer inlet, and cooling coils was charged with 1200 g. of the unsaturated polyol, prepared as described in Example I. Upon flushing the reactor with nitrogen it was evacuated to full vacuum. This was then heated with stirring to 125°C. Then a mixture of 171.6 g. of bis($\beta$-chloroethyl) vinyl phosphonate, 257.4 g. vinylidene chloride, 85.9 g. of styrene and 33.5 g. of VAZO were added at a temperature of 125°C. over a period of 180 minutes. The reaction mixture was then maintained at this temperature for one hour with continuous stirring. The reaction mixture was then stripped for one hour at less than 1 mm. Hg pressure at 125°C. The resulting product had a hydroxyl number of 37.6, a Brookfield viscosity at 25°C. of 6,600 centipoises and contained 1.51 percent phosphorus and 8.72 percent chlorine.

EXAMPLE X

Polyurethane foam compositions were prepared employing the graft copolymers of the present invention. In addition to the graft polyol, the other ingredients employed and amounts thereof include:

| Ingredient | Parts |
|---|---|
| Graft Copolymer | 33.3 |
| Polyol A | 66.7 |
| Water | 3 |
| Silicone DC-190 | 1.0–1.5 |
| Triethylenediamine | 0.3–0.4 |
| Stannous Octoate | 0.1–0.25 |
| Toluene Diisocyanate (80/20 2,4- 2,6-isomer mixture, 1.05 Index) | 39–40 |

Table 1

FOAM PROPERTIES

| Foam prepared from Graft Copolymer of Example | II | III | IV | VIII | X |
|---|---|---|---|---|---|
| Rise Time, sec. | 183 | 160 | 171 | 142 | 123 |
| Density, pcf. | 1.93 | 1.84 | 2.01 | 2.01 | 1.90 |
| Tensile, psi. | 12.0 | 15.9 | 14.5 | — | — |
| % Elongation | 148 | 216 | 175 | — | — |
| Tear, pi. | 1.9 | 2.5 | 2.3 | — | — |
| C.L.D., psi - | | | | | |
| 25% Defl. | 0.44 | 0.48 | 0.53 | — | — |
| 65% Defl. | 0.78 | 0.77 | 0.83 | — | — |
| Compression Sets, | | | | | |
| % at 50% | 5.5 | 8.3 | 5.0 | — | — |
| % at 90% | 27.4 | 7.8 | 5.7 | — | — |
| Humid Aged, | | | | | |
| % at 50% | 10.2 | 18.5 | 7.0 | — | — |
| % at 90% | 54.2 | 85.1 | 6.7 | — | — |
| Air Flow, cfm. | | | | | |
| 0.5″ H$_2$O | 2.7 | 1.8 | 3.9 | 0.14 | 0.96 |
| Burning Tests: | | | | | |
| Time self ext., sec. | 45.5 | 23.4 | 31.2 | 29.0 | 31.4 |
| Dist. consumed, in. | 3.0 | 1.9 | 2.2 | 2.0 | 2.1 |
| Burning type* | SX | SX | SX | SX | SX |

*SX means self-extinguishing

EXAMPLE XI

Additional polyurethane foam compositions were prepared employing the graft copolymers of the present invention. The other ingredients employed and amounts thereof include:

| Ingredient | Parts Formulation | |
|---|---|---|
| | 1 | 2 |
| Graft Copolymer | 33.3 | 20 |
| Polyol B | 66.7 | 80 |
| Water | 2.7 | 2.7 |
| Silicone Y-6454 | 0.5 | 0.5 |
| Triethylamine | 0.24 | 0.24 |
| Organic Acid Complex of Triethylenediamine | 0.9 | 0.9 |
| Bis(dimethylaminoethyl) ether | 0.17 | 0.17 |
| (Crude Toluene Diisocyanate/ toluene Diisocyanate 50/50 mixture, 1.05 Index) | 34.9 | 34.9 |

TABLE II

FOAM PROPERTIES

| Foam Prepared from Graft Copolymer of Example VII | Formulation 1 | Formulation 2 |
|---|---|---|
| Rise Time, sec. | 90 | 100 |
| Density, psi | 2.00 | 2.62 |
| Tensile, psi | 19.1 | 18.7 |
| % Elongation | 162 | 310 |
| Tear, pi. | 1.8 | 2.4 |
| C.L.D., psi. - | | |
| 25% Defl. | 0.36 | 0.20 |
| 65% Defl. | 0.75 | 0.48 |
| Compression Sets, | | |
| % at 50% | 15.3 | 38.4 |
| % at 75% | 13.4 | 94.7 |
| Humid Aged, | | |
| % at 50% | 19.2 | 12.2 |
| % at 75% | 20.7 | 11.3 |
| Air Flow, cfm. | | |
| 0.5" H$_2$O | 1.14 | 1.19 |
| Burning Tests: | | |
| Time self ext., sec. | 26.0 | 18.3 |
| Dist. consumed, in. | 2.0 | 1.2 |
| Burning type* | SX | SX |

*SX means self-extinguishing

The embodiments of the invention in which an exclusive property or privilege is claimed are defined as follows:

1. A fire retardant graft copolymer prepared by the in situ polymerization in the presence of a free radical catalyst at a temperature of from 70°C. to about 170°C. of a. an ethylenically unsaturated monomer or mixture of monomers, at least one of which contains phosphorus or phosphorus and halogen, and b. an unsaturated polyol having an acid number of about one or less and containing from about 1.0 mole to about 2.5 moles of ethylenic unsaturation per mole of polyol, said polymerization carried out by simultaneously adding at a steady rate the monomer and the catalyst to the polyol.

2. The copolymer of claim 1 wherein the monomer is bis($\beta$-chloroethyl) vinyl phosphonate.

3. The copolymer of claim 1 wherein the monomer is a mixture of bis($\beta$-chloroethyl) vinyl phosphonate and styrene.

4. The copolymer of claim 1 wherein the monomer is a mixture of bis($\beta$-chloroethyl) vinyl phosphonate and vinylidene chloride.

5. The copolymer of claim 1 wherein the monomer is a mixture of bis($\beta$-chloroethyl) vinyl phosphonate and vinyl chloride.

6. The copolymer of claim 1 wherein the unsaturated polyol is prepared by the reaction of an alkylene oxide with the reaction product of maleic anhydride with a polyether polyol having an equivalent weight of from 250 to 5,000.

7. The copolymer of claim 1 wherein the unsaturated polyol is prepared by the reaction of a polyhydric alcohol having from two to six hydroxyl groups with a mixture of propylene oxide and allyl glycidyl ether.

8. The copolymer of claim 1 wherein the catalyst is azo-bis(isobutyronitrile).

* * * * *